L. SMOLEN.
SPRING WHEEL.
APPLICATION FILED AUG. 19, 1915.

1,210,998. Patented Jan. 2, 1917.

Inventor
L. Smolen

By
Attorney

UNITED STATES PATENT OFFICE.

LOUIS SMOLEN, OF CHICAGO, ILLINOIS.

SPRING-WHEEL.

1,210,998.   Specification of Letters Patent.   Patented Jan. 2, 1917.

Application filed August 19, 1915. Serial No. 46,294.

*To all whom it may concern:*

Be it known that I, LOUIS SMOLEN, a citizen of the United States, residing at Chicago, in the county of Cook and State of Illinois, have invented certain new and useful Improvements in Spring-Wheels, of which the following is a specification.

This invention relates to certain new and useful improvements in spring wheels.

The primary object of this invention is to provide a resilient wheel that is easy and inexpensive to manufacture and by means of which the usual cushioning effect afforded by a pneumatic tire may be afforded with the employment of any desired form of solid tires.

A further object of this device is to provide a wheel having a resilient hub and provided with a plurality of spring spokes formed of single pieces of stamped resilient metal, thus providing a structure exceedingly strong and efficient in its operation.

With these general objects in view and others that will appear as the nature of the invention is better understood, the same consists in the novel construction, combination and arrangement of parts hereinafter more fully described, illustrated in the accompanying drawings, and pointed out in the appended claims.

Figure 1:
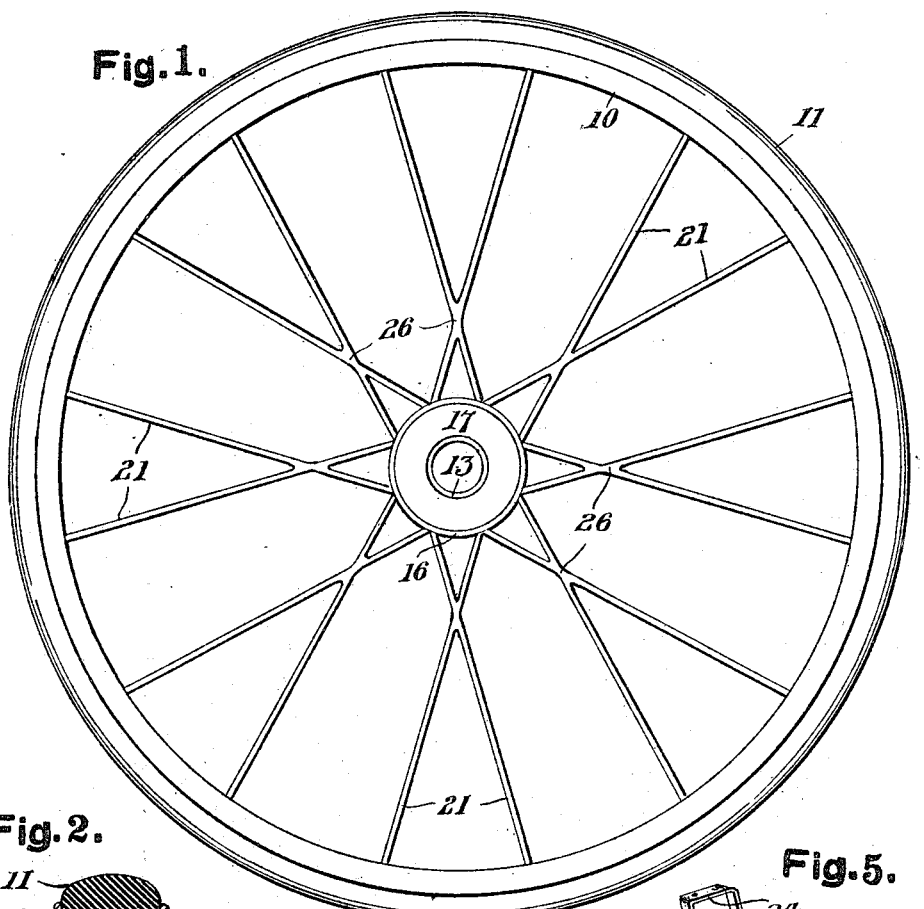
Figure 2:
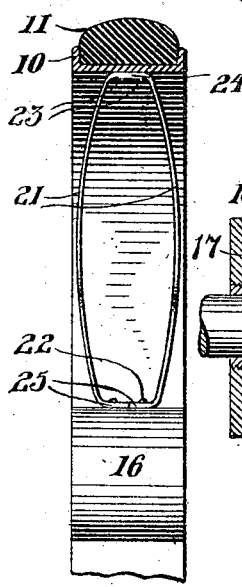
Figure 3:
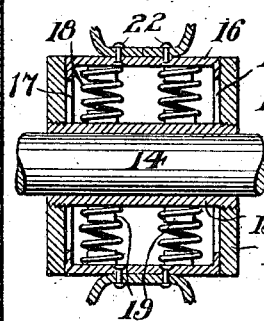
Figure 4:
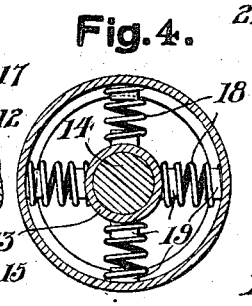

In the drawings forming a part of this application and in which like designating characters refer to corresponding parts throughout the several views: Figure 1 is a side elevation of a wheel of the present form. Fig. 2 is a detail view partially in radial section of the wheel under load. Fig. 3 is a diametrical sectional view through the wheel hub. Fig. 4 is a transverse sectional view thereof, and, Fig. 5 is a perspective view of one of the double spoke members detached.

The present invention relating to spring wheels provides the usual form of rim 10 having any desired tire 11 such as a solid rubber tire herein illustrated mounted therein. The hub 12 for the wheel is of novel formation and consists of a tubular sleeve 13 by means of which the wheel is adapted to be journaled on an axle such as 14 herein illustrated in Figs. 3 and 4. Oppositely-arranged inclosing disks 15 are secured in parallelism upon the sleeve 13 and concentric therewith while an annulus or ring 16 provided with inwardly-projecting flanges 17 is shiftably fitted between the said disks 15. Helical springs 18 are radially arranged between the sleeve 13 and the ring 16 and are retained in position by means of stub posts 19 carried by the adjacent faces of the said sleeve and ring and whereby the ring is resiliently mounted upon the said sleeve.

Figure 5:
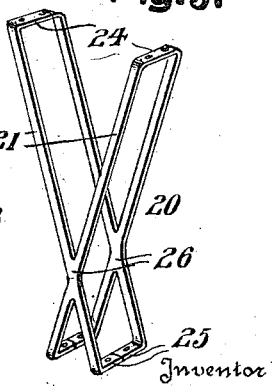

A form of double spoke member 20 best illustrated in Fig. 5 is formed by stamping the same out of resilient metal and then bending the stamped metal into double X-formation as herein illustrated and providing a pair of similar oppositely-inclined intersecting double spokes 21. These spokes 21 are arranged with parallel sides and are formed with attaching means consisting of parallel upper cross members 24 and similar lower cross-members or ends 25.

The required number of spoke members 20 are secured to the hub ring 16 by means of hold-fast devices such as 22, said spoke members connecting the said ring with the inner face of the rim 10 and being secured to the rim by similar hold-fast devices 23, it being noted that the points of intersection 26 between the separate spokes 21 of each spoke member 20 are positioned nearer the hub ring 16 than the rim 10 so that the ends 24 of the spokes lie at a greater distance apart around the inner face of the rim 10 than the distance between the inner ends 25 of the spoke members, the inner ends 25 of the adjacent spoke members 20 being positioned substantially in contact with each other.

In the completely assembled wheel as illustrated in Figs. 1 and 2 of the drawings, the spokes 20 it will be seen, resiliently support the rim 10 upon the hub ring 16, the spokes 21 bowing slightly outwardly as illustrated in Fig. 2 when the draft weight or tension is exerted thereon. The hub sleeve 13 as well as the vehicle axle 14 is resiliently supported by the spring 18 in addition to the resilient spokes 21 which are positioned beneath the said axle. It will be evident that as the wheel revolves upon the axle 14 which it supports, the springs 18 and the spokes 21 which are brought successively beneath the axle will successively receive the load while the spokes in the upper portion of the wheel will assist in suspendingly sustaining the axle from the upwardly positioned portions of the rim.

While the forms of the invention herein shown and described are what are believed to be the preferable embodiments thereof, it is nevertheless to be understood that various forms, modifications and arrangements of the parts may be made without departing from the spirit and scope of the invention as set forth in the appended claims.

What I claim as new is:—

1. A spoke member formed from a single piece of resilient metal and bent in substantially the form of double X-shaped spokes lying in parallelism and having parallel attaching portions at their opposite ends, the crossing points of the members being positioned nearer one end of the member than the opposite end thereof.

2. In a device of the class described, a rim, a hub, a plurality of spoke members connecting said rim and hub each being of double X-shape with portions positioned at opposite sides of the wheels, the portions thereof being in substantial parallelism and having their crossing points arranged adjacent the said hub.

In testimony whereof I affix my signature.

LOUIS SMOLEN.